United States Patent
Malomsoky et al.

(10) Patent No.: US 6,512,918 B1
(45) Date of Patent: Jan. 28, 2003

(54) METHODS AND ARRANGEMENTS FOR TRANSCODER SELECTION AND TRANSCODING DATA WITHIN PACKET-SWITCHED COMMUNICATION NETWORKS SUPPORTING RADIO INTERFACES

(75) Inventors: Szabolcs Malomsoky, Szentendre (HU); Ferenc Máthé, Mosdós (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 09/377,247

(22) Filed: Aug. 19, 1999

(51) Int. Cl.[7] ............................................. H03M 14/00
(52) U.S. Cl. ...................................... 455/403; 370/328
(58) Field of Search ................................ 455/403, 422, 455/560, 561; 370/310, 328, 338

(56) References Cited

U.S. PATENT DOCUMENTS

| | | | | |
|---|---|---|---|---|
| 5,771,452 A | * | 6/1998 | Hanley et al. | 455/445 |
| 5,953,666 A | * | 9/1999 | Lehtimaki | 455/439 |
| 5,987,327 A | * | 11/1999 | Lev et al. | 455/445 |
| 6,061,566 A | * | 5/2000 | Friman | 455/445 |

FOREIGN PATENT DOCUMENTS

| | | |
|---|---|---|
| DE | 196 19 04 C1 | 5/1996 |
| EP | 0 600 197 A2 | 10/1993 |
| GB | 0 600 197 A2 * | 6/1994 ............ H04B/7/26 |
| WO | WO 99/21383 * | 4/1999 ............ H04Q/7/30 |

OTHER PUBLICATIONS

Dong Myung Lee; "Performance Simulation of Call Capacity for Base Station in CDMA Mobile System"; Oct. 12, 1997; pp. 603–607.

* cited by examiner

*Primary Examiner*—William Trost
*Assistant Examiner*—Sharad Rampuria
(74) *Attorney, Agent, or Firm*—Jenkens & Gilchrist, P.C.

(57) ABSTRACT

Methods and arrangements are provided that can be used in selecting a transcoding processor and/or transcoding data in a packet-switched transport network portion of a communications system. The packet-switched transport network is configured to provide timely processing and communication of data between a time-critical node, such as, for example, a radio interfaced node, and an externally located switching and/or store-and-forward node that is required to provide transcoding of data. An initial alignment unit is provided to receive information about the time-critical node and information regarding the availability of suitable transcoding processors to perform the requisite transcoding tasks associated with the data being communicated. The initial alignment unit assigns a transcoding processor to handle the transcoding task substantially in accordance with an optimal departure time determined for the transcoded data. The transcoding processors are configured to provide internal scheduling status information to the initial alignment unit and/or an associated controlling processor.

21 Claims, 7 Drawing Sheets

METHODS AND ARRANGEMENTS FOR TRANSCODER SELECTION AND TRANSCODING DATA WITHIN PACKET-SWITCHED COMMUNICATION NETWORKS SUPPORTING RADIO INTERFACES

BACKGROUND OF THE INVENTION

1. Technical Field of the Invention

The present invention relates to communication systems, and more particularly to methods and arrangements incorporating packet-switched technologies into communications networks having time-critical radio interfaced communication nodes.

2. Description of Related Art

Traditional circuit-switched technologies require dedicated network resources. To the contrary, packet-switched technologies allow shared use of precious network resources, such as, for example, the communication links between network nodes. As such, the use of packet-switched communication technologies within communications networks tends to promote optimal use and improved efficiency of selected network resources. For this reason, there is a continuing drive within the telecommunications industry to integrate packet-switched technologies into existing communications networks in a manner that does not significantly degrade the quality of service provided to the network users or subscribers. In mobile telecommunications networks, for example, the use of a packet-switched network that is not well designed and dimensioned may potentially introduce an increased delay over traditional circuit-switched networks.

Consequently, there is a need to identify portions of existing communications networks that can benefit from packet-switched technologies without significantly diminishing the quality of service provided to the subscribers.

In accordance with certain aspects of the present invention, portions of a communications network that can be optimized by integrating packet-switched technologies have been identified. These portions include a transport network, for example, as found between a time-critical radio interface node and a switching node and/or a gateway node. In the past, transport networks have used circuit-switched technologies to provide dedicated communications resources between the two nodes. Such dedicated communications resources add significantly predictable and measurable delays to the communicated data. As such, the time-critical radio interface node is typically arranged to provide radio interface timing data to the switching node to further optimize processing and/or reduce communication related delays.

Circuit-switched technologies have the additional benefit that they can allow for transcoded data to be sent from the switching node to the radio interface node in very small increments (i.e., a couple of bits of transcoded data at a time), even before the entire transcoding operation is completed. Unfortunately, such circuit-switched transport networks and associated arrangements tend to require the availability of dedicated resources allocated according to the peak usage.

Introduction of more cost-effective, packet-switched technologies will significantly reduce the communication resource requirements. However, packet-switched technologies tend to be less predictable with regard to delays and require that larger packets of data be processed at a time by the switching node or gateway node. Consequently, many of the contemporary optimization solutions employed in existing circuit-switched transport networks and associated arrangements will need to be modified in order for packet-switched technologies to maintain the quality of service expected by subscribers.

SUMMARY OF THE INVENTION

The present invention provides methods and arrangements that can be used to integrate packet-switched technologies into communications networks and/or optimize the use of the packet-switched technologies to provide time-critical data between at least two nodes of a communications network.

The above stated needs and others are met, in accordance with certain embodiments of the present invention, by an arrangement for use in a communications network having at least one radio interface. The arrangement includes a transport network that is configured to carry packets containing coded data. A first node is connected to the transport network. The first node is configured to send and receive radio signals over a radio interface. The first node also outputs radio signal timing parameters associated with the radio signals.

At least a second node is connected also to the transport network. The second node includes a plurality of transcoders and at least one controller. Each of the plurality of transcoders is selectively configurable to convert between a first data format and a second data format, wherein the second data format includes coded data, for example compressed voice data.

The controller is configured to receive the radio signal timing parameters as carried over the transport network. The controller determines at least one desired coded data timing parameter based on the received radio signal timing parameters, and selects at least one of the transcoders to convert between the first data format and the second data format in support of a call.

The transcoder is preferably selected based on its availability to provide the coded data to the first node in significant accordance with the desired coded data timing parameter.

In certain further embodiments, each of the transcoders is configured to output corresponding current status information to the controller identifying the availability of the transcoder to support the call.

Furthermore, the transcoders in certain embodiments are configured to recursively process a plurality of concurrent calls by assigning each of the concurrent calls to at least one predefined processing period selected from a group of predefined processing periods. Thus, for example, the current status information for these transcoders could identify the unused processing periods.

In accordance with still further embodiments of the present invention, the first and second nodes in the above arrangement are part of a Global System for Mobile (GSM), wherein the first node includes a base transceiver station and the second node includes a base station controller, and/or a mobile switching center, and/or a gateway mobile switching center. Such an arrangement can be used to provide full-rate GSM calls, for example, between a mobile station and at least one non-GSM telecommunications terminal.

In accordance with other embodiments of the present invention, the above-stated needs and others are also met by arrangement for use in a communications network having a transport network that is configured to carry packets containing coded data. Here, the arrangement is operatively connectable to the transport network and includes a plurality of transcoders and at least one controller connected thereto. Each of the transcoders is selectively configurable to convert between a first data format and a second data format, wherein the second data format includes coded data. The controller is configured to receive radio signal timing parameters, determine at least one desired coded data timing parameter, and select at least one transcoder from among the plurality of transcoders to convert between the first data format and the second data format in support of a call based on the availability of the selected transcoder to provide the coded data in significant accordance with the desired coded data timing parameter. To support this selection process, each of the plurality of transcoders is configured to output current status information to the controller, wherein the current status information identifies the availability of the transcoder to support the call.

A method for use in a communications network having at least one radio interface is also provided, in accordance with certain embodiments of the present invention. The method includes the steps of arranging a transport network to carry packets containing coded data between a first node and a second node, using the first node to send and receive radio signals over a radio interface, and determining radio signal timing parameters associated with the radio signals. The method further includes the steps of providing a plurality of transcoders, each of which is selectively configurable to convert between a first data format and a second data format, the second data format containing the coded data, and using at least one controller to receive the radio signal timing parameters, determine at least one corresponding desired coded data timing parameter, and select at least one of the transcoders to convert between the first data format and the second data format in support of a call based on the availability of the selected transcoder to provide the coded data in significant accordance with the desired coded data timing parameter. In certain embodiments, the method also includes the step of causing each of the plurality of transcoders to output current status information to the controller, wherein the current status information identifies the availability of the transcoder to support the call.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION OF THE INVENTION

In accordance with certain aspects of the present invention, it has been determined that a portion of a mobile telecommunications network, for example a Global System for Mobile (GSM) communications system can significantly benefit by replacing traditional circuit-switched technologies with more efficient packet-switched technologies. In particular, the transport network that is used to provide communications between a radio base station node and one or more internal switching nodes or store-and-forward nodes has been identified as potentially benefitting from packet-switched technologies, in accordance with certain embodiments of the present invention.

To better understand the potential and significant benefits (and other features) associated with of the various embodiments of the present invention, an exemplary GSM network employing traditional circuit-switched technologies in a transport network is described in greater detail below. Selected improvements thereto, which use packet-switched technologies, are then described through certain exemplary embodiments of various methods and arrangements in accordance with the present invention.

Those skilled in the art will recognize that the exemplary embodiments of the present invention described herein can be implemented in a variety of networks wherein data is required to be transported between two or more nodes in a manner that tends to reduce delays, meet certain timing/queuing requirements, and/or provide a specified quality of service to the subscribers.

Figure 1:
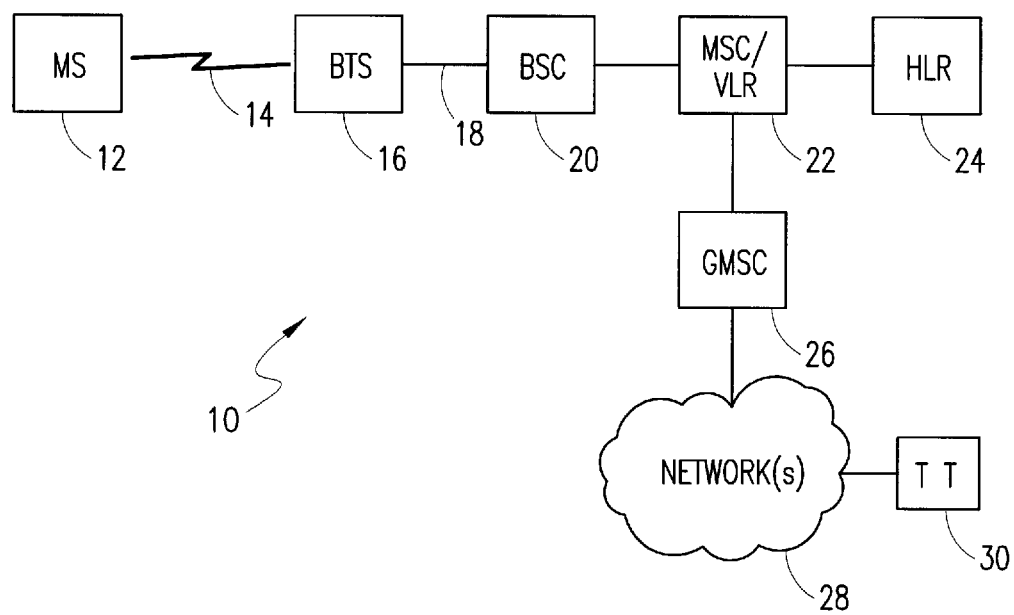
FIG. 1 is a block diagram depicting an exemplary conventional mobile communications system.

With this in mind, FIG. 1 is a block diagram depicting a conventional mobile communications system 10, such as, for example, a GSM communications system. Mobile communications system 10 includes a mobile station (MS) 12 that is configured to send up-link radio signals and receive down-link radio signals over a radio interface 14. MS 12 typically includes a radio transceiver and antenna (neither of which are depicted in FIG. 1) that are arranged to transmit and receive voice data over radio interface 14. Often, the voice data includes coded (e.g., compressed) data.

At the other end of radio interface 14 there is at least one base transceiver station (BTS) 16 that is similarly arranged to receive the up-link signals and transmit the down-link signals to/from MS 12 over radio interface 14. A plurality of BTSs, such as BTS 16, are usually connected to a base station controller (BSC) 20, through a transport network 18 or similar communications links/resources.

Data, such as voice data (coded data) associated with the up-link and down-link signals, are carried between BSC 20 and one or more switching nodes and/or other store-and-forward nodes. For example, as depicted in FIG. 1, a combined mobile switching center/visitor location register (MSC/VLR) 22 is depicted as being connected to BSC 20.

It should be kept in mind that transport network 18, as defined herein, can include communications links, resources, nodes, and the like, as are typically found between two remotely connected nodes.

MSC/VLR 22 is arranged to provide communication services to the subscriber associated with MS 12, for both incoming and outgoing calls. To accomplish this, a typical MSC/VLR 22 is further connected to a home location register (HLR) 24 that is arranged to identify services that are to be provided to the subscriber when registered for service by MSC/VLR 22. MSC/VLR 22 is further connected to selectively exchange data, such as, for example, the voice data associated with a call to/from MS 12, with one or more additional switching nodes.

Thus, for example, as shown in FIG. 1, MSC/VLR 22 is connected to a gateway mobile switching center (GMSC) 26. GMSC 26 is arranged to interface mobile communications system 10 with one or more other networks 28, such as, for example, a public switched telecommunications network (PSTN) or the like. Network(s) 28 provide the additional communication capability required to provide for incoming and outgoing calls to MS 12, for example, from/to a remotely located telecommunications terminal (TT) 30.

As is well known in the art, incoming and/or outgoing calls require that the data carried by transport network 18 (e.g., between BTS 16 and BSC 20, BTS 16 and MSC/VLR 22, and/or BTS 16 and GMSC 26), needs to be coordinated in a manner that provides the requisite quality of service (QoS) to the subscriber. The quality of service can be significantly degraded by introducing excessive propagation delays in the voice data stream carried by transport network 18.

In a typical GSM communications system, the down-link signal data processing usually requires that a transcoder portion (e.g., see, FIG. 2) within the switching node or store-and-forward node (hereinafter, referred to generically as a "switching node") be properly "phase aligned" to radio interface 14 to avoid long buffering delays of the (data) frames within BTS 16. For example, in a traditional GSM communications system the transcoder portion of the switching node is aligned with radio interface 14 associated with each call being handled to provide an adequate quality of service to the subscriber. The switching node, therefore, is typically configured to conduct an initial time alignment (ITA) or like process that determines the proper (desired) timing/phase of the data signal that should be carried via transport network 18 and eventually down-linked over radio interface 14. The proper timing of the arriving data tends to reduce delays.

Figure 2:
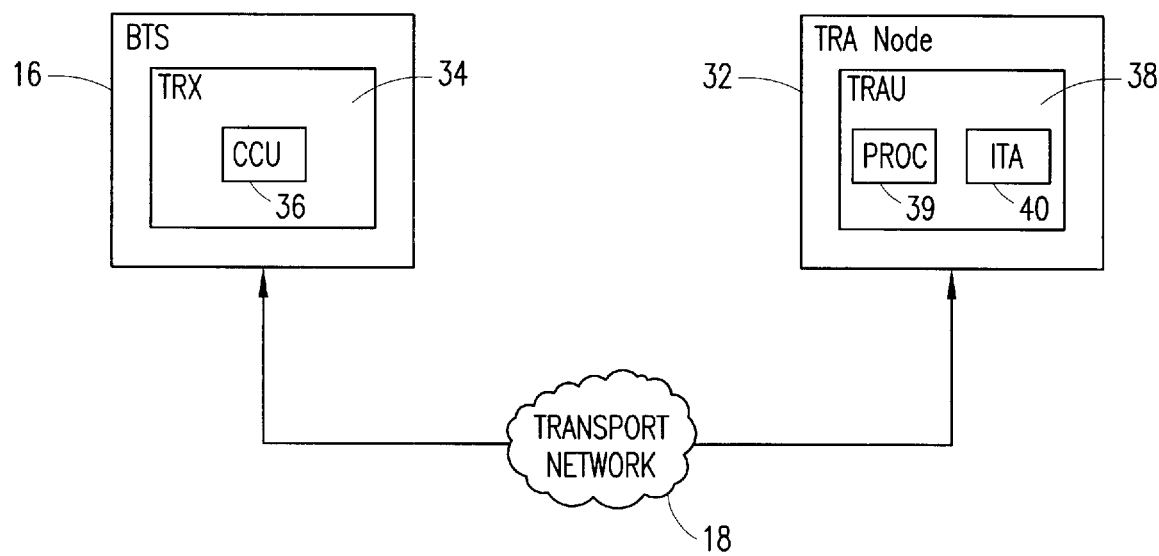
FIG. 2 is a block diagram depicting a more detailed portion of a circuit-switched transport network arrangement suitable for use in the mobile communications system in FIG. 1.

FIG. 2 is a block diagram depicting a more detailed portion of the exemplary mobile communications system 10, of FIG. 1. As depicted, within BTS 16 there is a transceiver (TRX) 34 that includes a channel coding unit (CCU) 36. CCU 36 is connected to the switching node through transport network 18. The switching node, identified as transcoder rate adapter (TRA) node 32, includes a transcoder rate adapter unit (TRAU) 38, having at least one transcoder 39 and an associated initial time alignment (ITA) 40 capability.

In a conventional circuit-switched transport network arrangement, CCU 36 determines the timing requirements/parameters associated with radio interface 14. For example, in certain arrangements, CCU 36 determines, with significant accuracy, information that identifies the moment in which the voice frames in the down-link signal should be transmitted over radio interface 14 to MS 12.

TRAU 38, in this example, is configured to perform conversion or transcoding between GSM compressed voice formats and the PSTN uncompressed (PCM) representation using transcoder 39, which typically includes a data processor, for example a digital signal processor (DSP). TRAU 38 is usually located in the serving BSC 20 or MSC/VLR 22. CCU 36 and TRAU 38 are connected by a logical channel within transport network 18, including respective data and signaling subchannels. The signaling subchannel carries signaling information relating to the synchronization of CCU 36 and TRAU 38.

Figure 3:
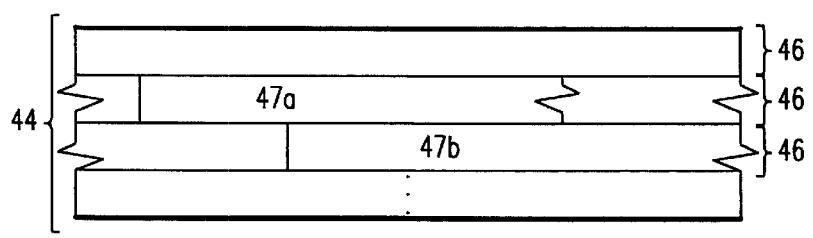
FIG. 3 is a time-line diagram depicting an exemplary physical channel carrying transport frames in its subchannels, as implemented in the arrangement of FIG. 2.

FIG. 3 depicts an exemplary physical channel 44, which is usually a 64 kbps link between CCU 36 and TRAU 38, having a plurality of logical data subchannels 46 providing (data) frames 47a–b. In the 64 kbps channel 44 depicted in FIG. 3, the logical subchannels 46 are each capable of transmitting two (2) bits within 125 microseconds, thereby providing a bit rate of about 16 kbps. The compressed form of voice (i.e., coded data) is packed into TRAU frames 47 in the up-link and down-link directions by CCU 36 and TRAU 38, respectively.

Frames 47 follow back-to-back during normal operations. As such, each of the logical subchannels 46 is constantly allocated during its respective call and operates substantially independent from traffic on the other logical subchannels. As a consequence, the phases of transmitted frames 47a and 47b, for example, can be chosen independently.

The delay associated with transport network 18 is determined in large-part by the signal propagation delays of the circuit-switching elements crossed by the data. In most conventional circuit switched arrangements, this results in a relatively short delay time that is significantly consistent over time. This is an important quality of service requirement in most GSM communications systems, because radio interface 14 and other network resources can cause significantly long and practically not reducible delays. As such, the fulfillment of related delay constraints is often measured in milliseconds.

For down-linked signals, the (data) frames leave TRX 34 at a moment determined by the radio interface timing parameters. As would be expected, this radio interface timing is different for different cells. It is preferred, however, that the frames be minimally delayed within CCU 36 prior to radio transmission once received over transport network 18. CCU 36 is arranged to provide buffering of the frames. This additional delay is added to the overall down-link signal delay.

Figure 4:
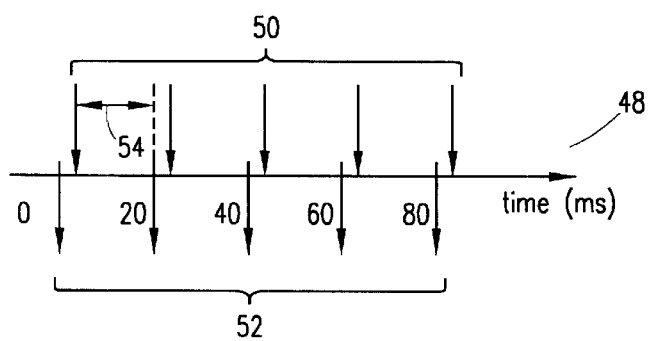
FIG. 4 is a time-line diagram depicting frame arrival times and the corresponding frame departing times with respect to a time critical radio interface in the arrangement of FIG. 2.

FIG. 4 is an exemplary time-line diagram 48 depicting arrival times 50 of frames at TRX 34 and the corresponding departing times 52 for the frames transmitted over radio interface 14. Time period 54 depicts the delay time associated with BTS 16.

To avoid excessive and/or unnecessary delays, the arrival time of voice frames at TRX 34 is therefore aligned (timed) to correspond to those moments, as determined by the radio interface timing parameters, when the frames can be transmitted to MS 12 with minimal buffering delay within BTS 16. Thus, optimal alignment prevents the frames from waiting for a significant length of time in TRX 34, for example, just because the phase of transcoding is not set correctly. In conventional circuit-switched GSM arrangements, ITA 40 determines this alignment.

As can be seen by FIGS. 1 through 3, the frame arrival at TRX 34 is dependent solely upon the end phase of the processing in TRAU 38, since the delay associated with transport network 18 is determinable and substantially constant during the call. Thus, to optimally align the processing phase of TRAU 38, an in-band signaling protocol is used between CCU 36 and TRAU 38 to provide feedback to TRAU 38 that optimizes the arrival time of frames 47 at CCU 36.

For example, when a call is established, TRAU 38 begins by sending frames 47 at an arbitrarily selected phase. CCU 36 determines the necessary change of the frame arrivals (i.e. the necessary change of the processing phase) and reports this to TRAU 38, as feedback. TRAU 38, having received this feedback, then modifies the channel's processing phase accordingly. As the delay of logical subchannel 46 is substantially constant, the frame arrival can be aligned to the radio interface timing very accurately.

This tends to simplify the transcoder selection process and subsequent transcoding processes within such circuit-switched transport networks. For example, a typical transcoder selection process within TRA node 32, would include the steps of: (1) arbitrarily selecting a free transcoder channel; and then (2) performing an ITA process to minimize the delays incurred.

This implies, that the required phase of frame departures at TRAU 38 is not known to the allocating or controlling unit/function prior to the channel allocation and the ITA process needs to be performed by the allocated transcoder 39, itself. Thus, this commonly implemented solution requires that TRAU 38 be able to set the phase of the transcoding of its channels to the timing determined by CCU 36 and that the newly started channel does not deteriorate the timing of other channels.

To provide for full-rate GSM transcoding, transcoder 39 needs to have about 5 MIPS of processing capability. Since this 5 MIPs capability is substantially lower than the total processing capacity of most state-of-art DSPs, each transcoder 39 is configured to process a plurality of channels. As high resource utilization is required, more channels are processed on the same transcoder 39. To allow for independently selectable processing phases, the processing of one DSP's channels can be performed quasi-parallel, with preemptive round-robin processor scheduling, for example, as depicted in FIG. 5.

Figure 5:
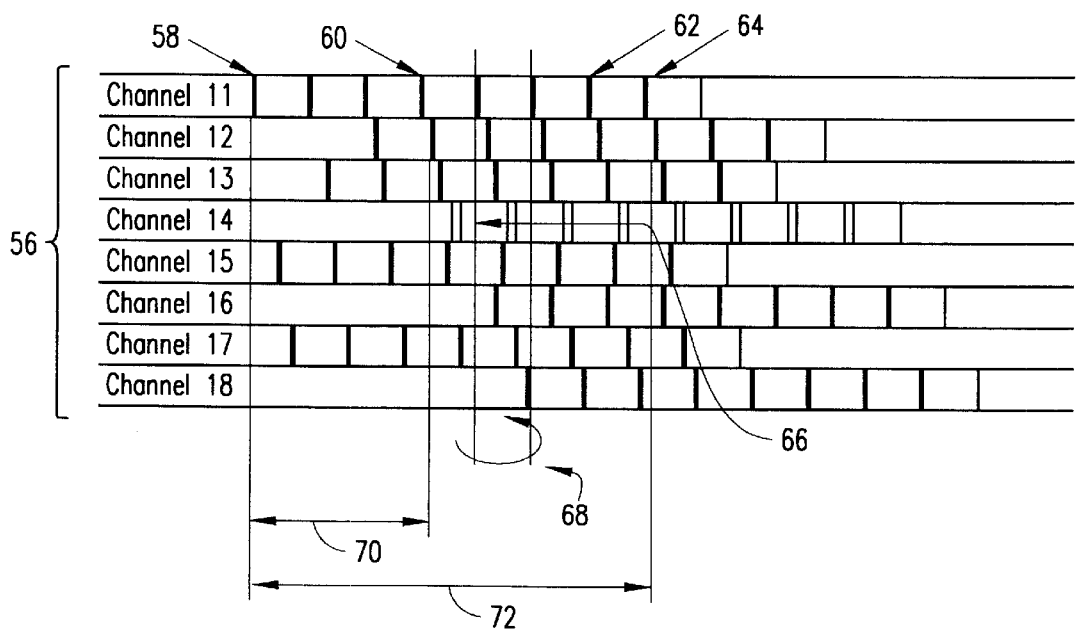
FIG. 5 is a time-line diagram depicting a plurality of channels and associated processing periods of time and related arrival and departure times of frames transmitted over the detailed portion of a circuit-switched transport network arrangement of FIG. 2.

FIG. 5 is a time-line depicting a plurality of channels 56 (identified as "channel 1" through "channel 8"), each of which includes a plurality of processing slots 58, wherein, for example, time 60 depicts when the first bits are ready for transmission, time 62 identifies a processing stage, and time 64 depicts when the processing is completed. As depicted by reference pointer 66, "channel 4" is idle. A round-robin scheduling process is graphically depicted by reference pointer 68. Time period 70 represents the effective transcoder delay and time period 72 represents.the total processing time.

Thus, since the processing of a channel means the continuous processing of frames, wherein each frame represents a segment (e.g. 20 ms) of the speech flow, the processing of a frame can be divided into a number of equal length stages. As such, transcoder 39 is programmed to process stage 62 in steps. The stages of all channels are scheduled according to round-robin scheme 68. As such, the down-link transmission of a frame can be started before the processing of the frame in the DSP is actually finished, because there is no store-and-forward type of device after transcoder 39, but instead a bit-pipe-like channel is used.

In such a system, the effective down-link transcoding delay can be expressed as:

$$d_{effCS} = t_{interframe} \cdot \alpha \cdot \delta$$

In the above equation and those that follow below, the following notations are used: $\alpha$ represents the fraction of processing time after which first bits of the frame are ready (e.g. 50%), $t_{interframe}$ represents the frame repetition time (e.g. 20 ms), $d_{effCS}$ represents the effective transcoder delay in the circuit switched system (e.g. 10 ms), $d_{effPS}$ represents the effective transcoder delay in the packet switched system, $d_{proc}$ represents the total processing delay, $\delta$ represents the processor utilization, and n represents the number of channels processed on the same processor.

For example, if after 40% of the whole processing time, the first bits of the down-link frame are available to be sent on the dedicated logical subchannel 46 to TRX 34, and assuming 100% processor utilization, the effective delay of transcoder 39 is 40% of about 20 ms, or about 8 ms.

Unfortunately, since the aforementioned exemplary circuit-switched transport network arrangement (in particular ITA 40 and transcoder 39) relies heavily upon substantially predictable and/or consistent delay/processing parameters, they cannot be readily converted for use in systems that incorporate more cost-effective packet-switched technologies.

Therefore, in accordance with certain aspects of the present invention new methods and arrangements are provided to overcome such problems and to allow for existing and/or new switching nodes to be configured for use with packet-switched transport network arrangements.

As with the circuit-switched transport network arrangements described above, for packet-switched transport network arrangements minimizing the overall delay is an important requirement. In accordance with certain embodiments of the present invention, to reduce buffering delays a modified ITA-like process is used to support the determination of optimal phase timings and transcoder selection to optimize the use of a transport network having packet-switched technologies.

The introduction of packet-switched transmission brings many changes to the transport network and connected resources. For example, the (data) frames will need to be encapsulated in packets and transferred as a transmission unit. Thus, the frames can no longer be divided into small (e.g., 2 bit) increments for transcoding and immediate transmission across the transport network. Further, the frames will not be transported in separate logical subchannels in parallel to other logical subchannels. Instead, the interconnecting communication resources of the packet-switched transport network are shared by the various channels (calls).

For the transcoder(s) the packet-switched transmission requires that all of the bits of a given frame be processed and ready prior to the frame being output within a packet. As such, the transcoding of a frame is preferably performed in one continuous step.

If a conventional transcoder process were to be used in a packet-switched system, then processing would be quasi-parallel, and the total length of the processing would be approximately equal to the inter-frame time for any frame of any channel, (or less if the utilization of the processor were less, which would tend to be a waste).

This solution would result in an increased effective transcoder delay of:

$$d_{effPS} = t_{interframe} \delta = d_{effCS} 1/\alpha$$

For example, at about a 100% load, 10 channels could be processed on the same processor. The first samples would be available after about 40%, or about 8 ms. When running parallel, all channels would be ready about 20 ms after the start of the processing, independently from others. Transfer of the frames could only start after finishing all of the processing. This would add about 12 ms (20 ms–8 ms) to the effective transcoding delay, as compared to the circuit-switched example.

Figure 6:
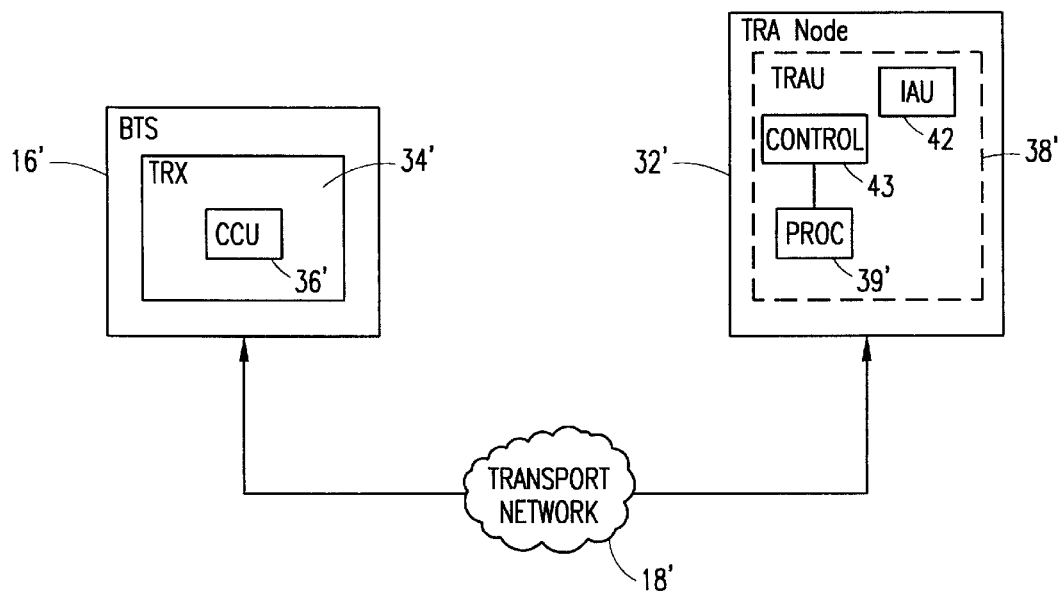
FIG. 6 is a block diagram depicting an exemplary packet-switched technology arrangement, in accordance with certain embodiments of the present invention, that can be used in place of the conventional circuit switched technology arrangement as depicted in FIG. 2.

FIG. 6 is a block diagram depicting an exemplary packet-switched technology arrangement, in accordance with certain embodiments of the present invention, that can be used in place of the conventional circuit switched technology arrangement depicted in FIG. 2.

Here, transport network 18' is configured to carry packetized data between BTS 16' and TRA node 32', each of which include modified capabilities to communicate using packetized data (e.g., in BTS 16' there is a modified TRX 34' and CCU 36', and in TRA node 32' there is a modified transcoder 39' and, as applicable, a modified TRAU 38'). Further depicted within TRA node 32' and connected to transcoder 39' is at least one controller 43.

The ITA 40 capability of FIG. 2, which was previously associated with transcoder 39 within TRAU 38, has been incorporated or otherwise replaced by an initial alignment unit (IAU) 42 capability that is associated with controller 43.

Figure 7:
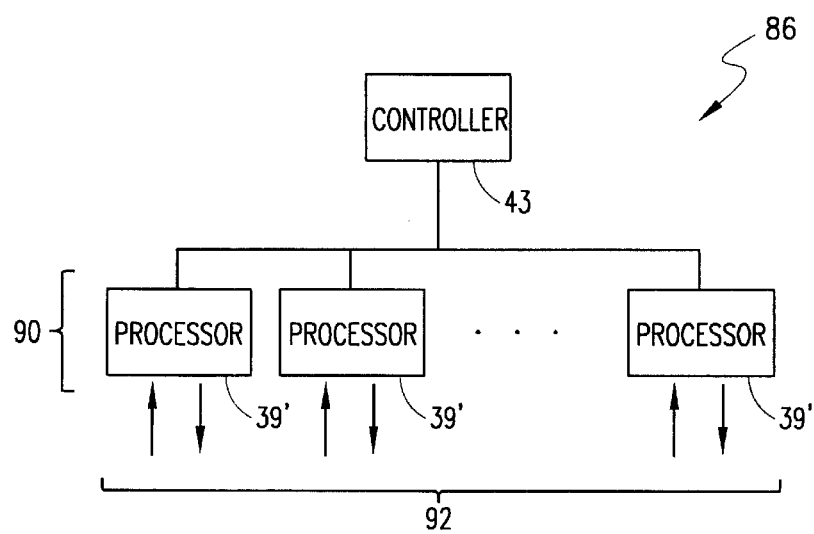
FIG. 7 is a block diagram depicting a portion of an exemplary packet-switched technology arrangement, as in FIG. 6, having a plurality of transcoding processors, in accordance with certain embodiments of the present invention.

In accordance with certain aspects of the present invention it was determined that the optimal departure times for the various channels processed by TRA node 32' will probably differ significantly when packet-switched technologies are introduced. One reason for this difference is that each TRA node 32' will typically process a large number of voice connections (e.g., hundreds or thousands of concurrent connections) associated with a large number of radio cells and it is unlikely that the radio interface timing of these cells/connections will be phase synchronized, since it is not required by the overall system. Thus, there will likely be a unique phase offset associated with each channel's radio interface timing parameters. In a multiple-transcoder configured TRA node 32', for example, as depicted in the block diagram of FIG. 7, these phase offsets will likely be randomly distributed among a plurality 90 of transcoders 39', as calls are connected/disconnected over time.

Delay optimization can be introduced, nevertheless, by modified TRA node 32', which is configured to determine which of the plurality 90 of transcoders 39' is best suited to perform the transcoding for a given call prior to assigning the transcoding task to an individual transcoder. This requires having controller 43 determine or otherwise estimate an optimal phase offset for the call connection being made, and then assigning the transcoding task to an available transcoder 39' that is able to significantly provide (i.e., able to come acceptably close to) the estimated optimal phase offset.

This can be accomplished, for example, using the IAU 42 capability, prior to the assignment of the transcoding task to a transcoder 39'. The IAU. capability determines an estimated optimal phase offset for the connection being made over radio interface 14. The IAU 42 capability, which can be accomplished, for example, by controller 43, is configured to determine an optimal departure moment for a new connection/channel based on feedback received from CCU 36'. An exemplary technique for use in providing the aforementioned feedback from CCU 36' will now be described.

The TRAU and the TRX will be two end points from the viewpoint of the connecting packet network 18' of FIG. 6. (Note that in other embodiments, the BTS, the TRX or even the CCU may be a full featured network end point, but this is only an issue for addressing and routing, and not for performance or delay). There will be parallel packet flows between these two end points for the particular "voice over packet" connections. The route of these packet flows can generally be expected to be the same, because the routing typically does not handle particular flows differently. This implies that the elements in transport network 18' that are responsible for jitter (e.g., routers, multiplexers) will be the same for all flows terminating at, for example, a given BTS. Furthermore, it can be generally assumed that one BTS will always be served by a single TRA node.

The above mentioned features of the transport network 18' support an assumption that the distribution of the packet delays will be similar for all packet flows carrying voice connections. Thus, these distributions can generally be described with the same set of parameters.

In order to determine the optimal time of departure of frames from the TRA, the IAU and the CCU cooperate. The IAU is a functional unit of the TRA node, and is thus at the same point from the transport network point of view.

The IAU sends a small number of probe frames towards the CCU regularly with an arbitrary and thus non-optimal phase. (These frames can be sent during the connection setup, and need not be delivered to the user). The CCU collects statistics of the arrival phases of the probe frames at the BTS.

For simplicity it can be assumed that the distribution of packet network delays is Gaussian. The Gaussian normal distribution $N(\mu,\sigma)$ can be described with two parameters: $\mu$—mean value, which gives the position of the distribution; and $\sigma^2$—variance, which tells how dispersed is the distribution. The CCU can determine that point of the distribution of arrival phases (which is equivalent to the distribution of packet network delays), where only less than a very small and, from a QoS point of view, tolerable fraction of packets (e.g., $10^{-4}$) is delayed beyond that point. Let this fraction be denoted a, and let the corresponding point of the distribution be called the a-quantile point and denoted by q.

If the distribution of the delays is known to be Gaussian, the a-quantile point can be expressed with the parameters as $$q = \sigma \phi^{-1}(1-a) + \mu,$$

where $\phi^{-1}$ is the inverse of the Guassian Cumulative Distribution Function.

If the CCU can determine the parameters of the distribution, then the quantile point can be calculated. The quantile point of the distribution should then be aligned to the required departure moments determined by the air interface timing.

The parameters of the Gaussian distribution can be estimated fairly easily based on a few samples from the distribution, that is, samples of the arrival phases of the probe packets. Denote these sample arrival phases by $x_i$. One estimation of the mean is the average $\hat{\mu}$ of n samples:

$$\hat{\mu} = \frac{1}{n}\sum_i x_i$$

A consistent and unbiased estimator for the variance is:

$$\hat{\sigma}^2 = \frac{1}{n-1}\sum_i (x_i - \hat{\mu})^2$$

The CCU can calculate the variance parameter based on arrival phases of all existing flows, and not only on the probe packets. This is advantageous because this allows for greater accuracy due to a much higher number of samples than in the case where only the probe packets' phases are taken into account.

Using the estimates for the mean and the variance, the CCU is able to calculate the a-quantile. Then the CCU is able to calculate the difference between this a-quantile and the departure moment on the radio interface. This difference information can then be returned to the IAU. The IAU then knows the arbitrarily selected sending phase, and the phase difference relative thereto that is required to achieve optimal arrival at the CCU, which permits the IAU to determine an optimal departure moment at which packets should depart from the TRAU 38'.

Consequently, unlike traditional circuit-switched configurations, the time alignment process has essentially been de-coupled from the transcoding process (e.g., transcoder 39' is not itself associated with time alignment operations).

Figure 12:
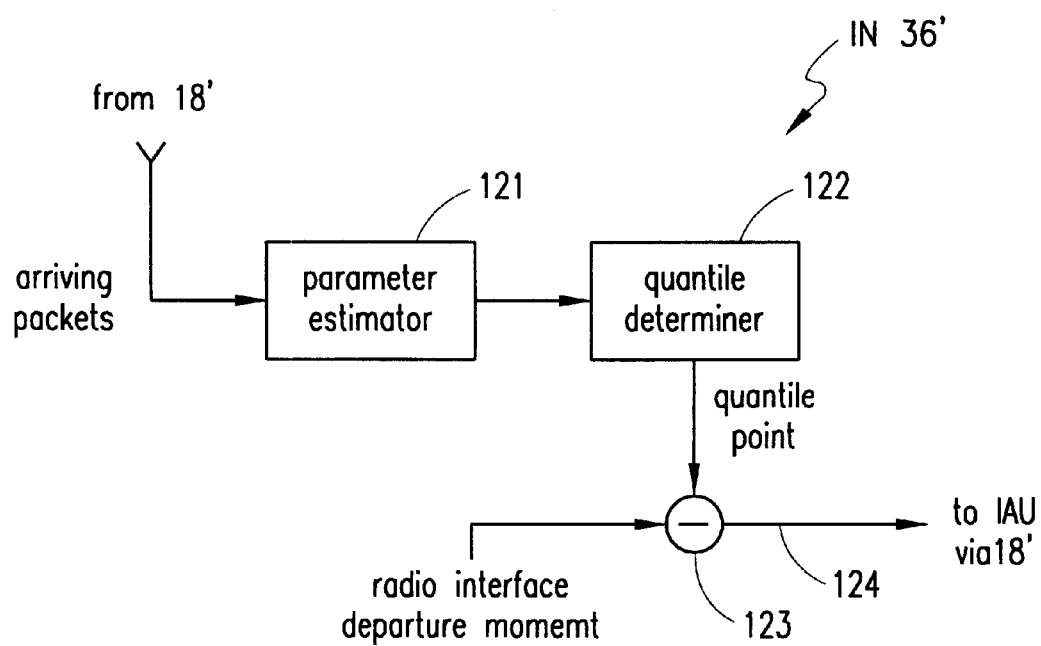
FIG. 12 illustrates pertinent portions of an exemplary embodiment of the CCU of FIG. 6.

FIG. 12 illustrates pertinent portions of an exemplary embodiment of the CCU 36' of FIG. 6. In the example of FIG. 12, a parameter estimator 121 receives packets (including probe packets) arriving from the transport network 18'. The parameter estimator 121 estimates parameters of the arrival phase distribution of the arriving packets. These estimated parameters are provided to a quantile determiner 122 coupled to the parameter estimator 121. The quantile determiner 122 is responsive to the estimated parameters to determine the desired quantile point of the arrival phase distribution. A difference determiner 123 is coupled to the quantile determiner to receive therefrom the desired quantile point. The difference determiner 123 also receives information indicative of the departure moment on the radio interface, and determines the difference between the radio interface departure moment and the desired quantile point. Information indicative of this difference is then provided at 124 to the IAU (via the transport network 18').

Figure 13:
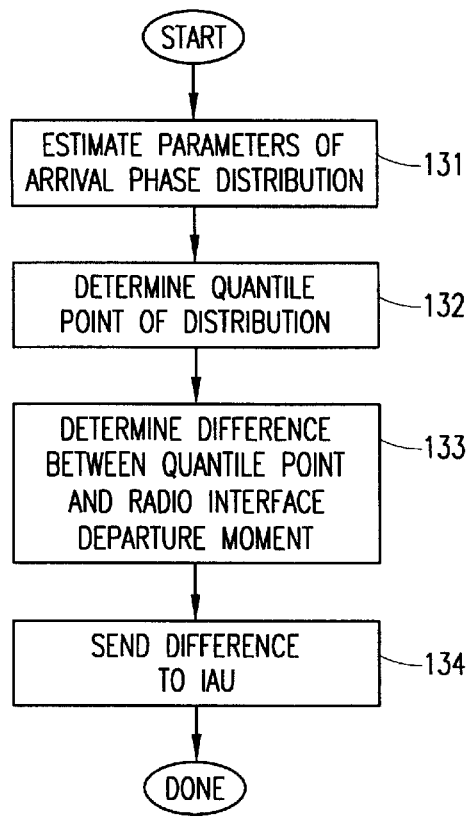
FIG. 13 illustrates exemplary operations which can be performed by the CCU embodiment of FIG. 12.

FIG. 13 illustrates exemplary operations which can be performed by the exemplary CCU embodiment of FIG. 12. At 131, received frames (including probe frames with arbitrary phase) are used to estimate the parameters of the arrival phase distribution. At 132, the quantile point of the arrival phase distribution is determined. At 133, the difference between the quantile point and the radio interface departure moment is determined. At 134, information indicative of the difference determined at 133 is sent to the IAU.

Figure 14:
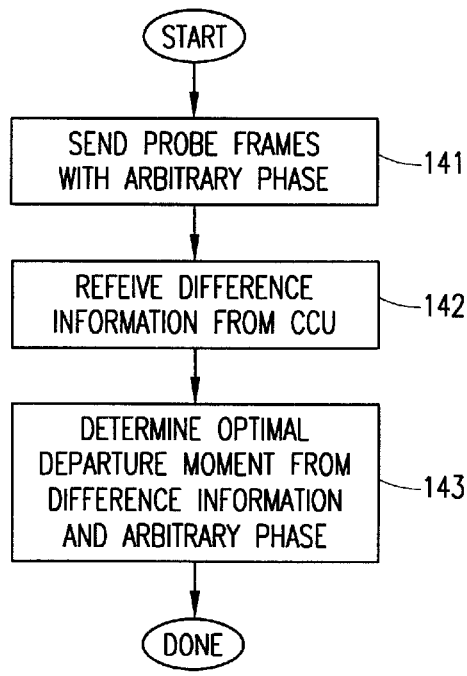
FIG. 14 illustrates exemplary operations which can be performed by the IAU of FIG. 6.

FIG. 14 illustrates exemplary operations which can be performed by the IAU (or controller 43) of FIG. 6. At 141, probe frames with arbitrary phase are sent to the CCU via the transport network 18'. At 142, information indicative of the difference between the quantile point and the radio interface departure moment is received. At 143, the optimal departure moment is determined from the received difference information and the arbitrary phase of the probe frames, for example, by adding or subtracting the received difference to or from the arbitrary phase. After the IAU 42 capability estimates the optimal departure moment, controller 43 then selects an appropriate transcoder 39' to perform the transcoding for the call connection, for example, based on the availability of transcoder 39' to provide timely transcoding of the data relative to the optimal departure moment.

Additionally, transcoder(s) 39' are preferably configured to report or otherwise provide their current internal scheduling status to controller 43, for example, indicating any processing cycles or predefined periods of time that are idle and thus available for performing transcoding operations.

Thus, upon activation of a new channel, the optimal departure moment for the new channel is determined by the IAU 42 capability and provided to controller 43, which then attempts to match this optimal departure moment to a specific transcoder 39' that has processing capability available to perform and complete the actual transcoding before (and preferably as nearly as possible before) the determined optimal departure moment.

As a consequence of the above modifications, transcoder selection is accomplished based on the optimal departure moment information available in TRA node 32', and the transcoding task is better suited to the packet-switched technologies, which tends to reduce frame delay times. Further, transcoders 39' are more accurately assigned, thereby leading to increased efficiency and substantially minimal frame delays.

In certain arrangements, if the additional delay caused by the simultaneous use of packet transmission and parallel processing transcoders 39' (e.g., the aforementioned additional 12 ms delay) is unacceptable, then further enhancements can be had by changing the processing in the TRA node 32' from parallel to sequential. As such, a transcoder 39' is essentially adapted to match the nature of sequential packet transmission. In this case there must also be an appropriate scheduling of frames which are ready to be processed. Such sequential, one-step processing of (data) frames can be conducted in transcoder 39', for example, by using a simple FIFO scheduling process. If transcoder 39' takes one frame at a time, then the processing of this frame is completed within a time associated with the transcoder's processing capacity, as shown here:

$$t_{proc} = \delta \cdot t_{interframe}/n$$

For example, if a frame takes about 2 ms ($\delta$=100%, $t_{interframe}$=20 ms, n=10 channels) to transcode, then during the processing of this frame all other frames will have to wait. This leads to two scenarios, an unbalanced processing need and a balanced processing need.

Figure 8:
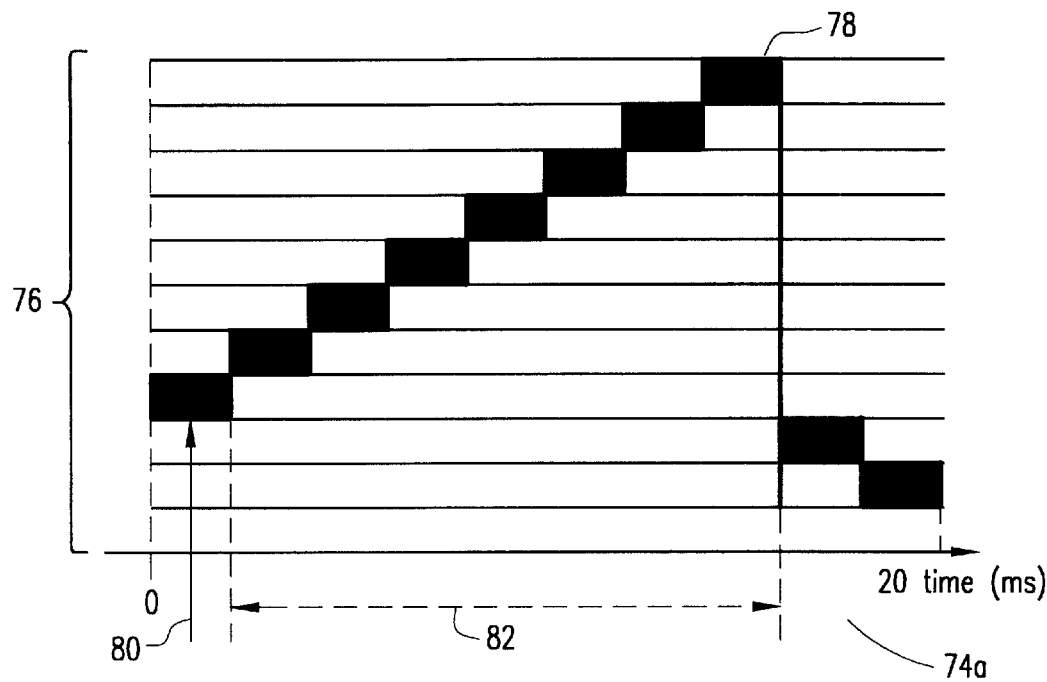
FIG. 8 is a time-line diagram depicting an example of a balanced processing need in a transcoding processor, for example, as in FIGS. 6 and 7, in accordance with certain embodiments of the present invention.

An example of an unbalanced processing need in transcoder 39' is depicted in time-line 74a of FIG. 8. Here, it is assumed that the optimal departure times for each of the channels 76 processed on one transcoder 39' are substantially the same (e.g., see processing deadline time 78). As such, some of the channels' frames (e.g., see frame 80) must be processed in advance of processing deadline time 78 and then buffered. Buffering can occur in either TRA node 32' and/or TRX 34', for example. Optionally, the frames can also get processed "just in time", without waiting (if possible). The delay 82 associated with TRA node 32', in an unbalanced scenario can be anywhere from about 2 ms to about 20 ms, depending on the number of channels being processed.

Figure 9:
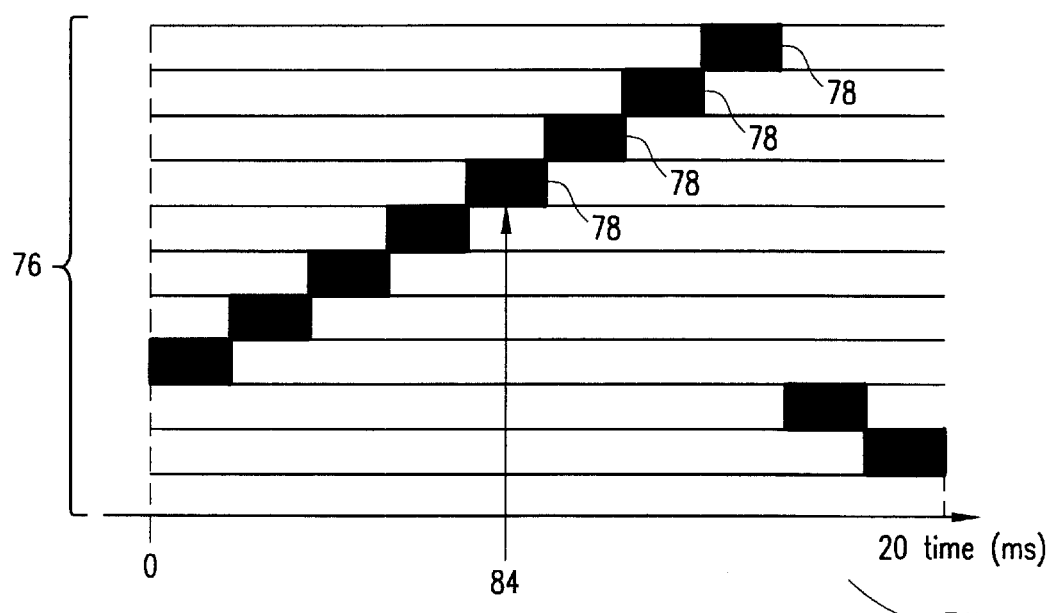
FIG. 9 is a time-line diagram depicting an example of an unbalanced processing need in a transcoding processor, for example, as in FIGS. 6 and 7, in accordance with certain embodiments of the present invention.

An example of a balanced processing need in transcoder 39' is depicted in time-line 74b of FIG. 9. Here, it is assumed, for example, that the optimal departure times of each of the channels 76 are spread equally in the 20 ms processing cycle. As such, transcoder 39' can process the various channels' frames in sequence of departure times and, if possible, process all of them just in time before their respective processing deadlines 78 (e.g., see frame 84). Taking the above example, this would cause only 2 ms delay for a channel in TRA node 32'. This is significantly lower than the possible delay of 20 ms in FIG. 8.

Figure 10:
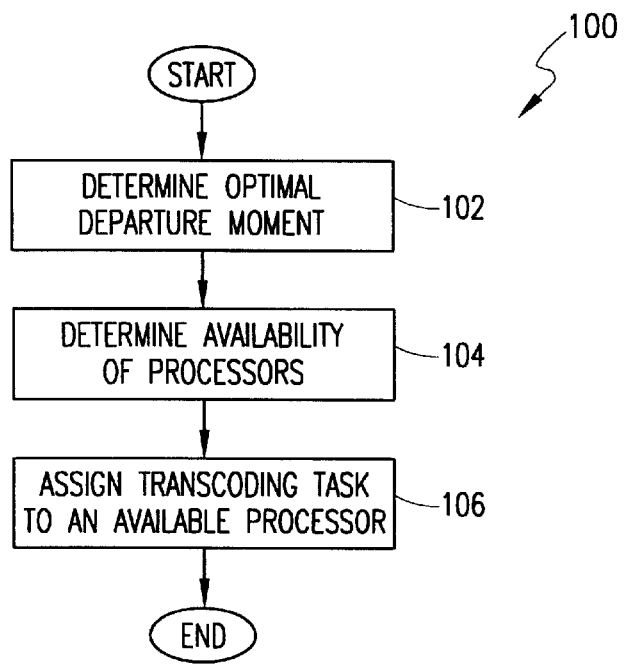
FIG. 10 is a flowchart depicting a process for selecting a transcoding processor within a node for use in transcoding a specified channel's data, in accordance with certain embodiments of the present invention.

FIG. 10 is a flowchart depicting an exemplary process 100 for selecting a processor within a node for use in transcoding a specified channel's data. In step 102, the optimal departure moment is determined (see, e.g., FIGS. 13 and 14). In step 104, information indicative of the availability of the various transcoding processors to provide the requisite transcoding task is received (e.g., by controller 43). Then, in step 106, the transcoding task is assigned (e.g., by controller 43) to an available processor (preferably the best suited processor) based on the results of steps 102 and 104.

Figure 11:
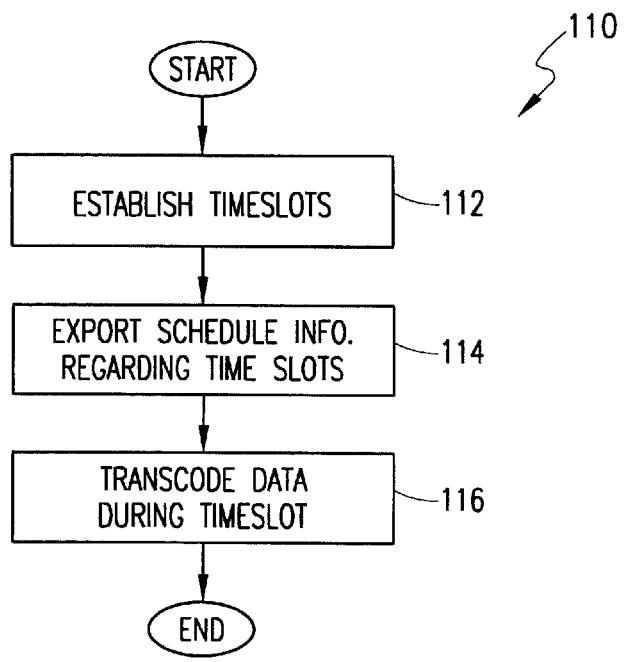
FIG. 11 is a flowchart depicting a process for use in configuring a processor to transcode a specified channel's data, in accordance with certain embodiments of the present invention.

FIG. 11 is a flowchart depicting an exemplary process 110 for use in configuring a processor to transcode a specified channel's data. In step 112 are defined a plurality of unique, sequential periods of time, or time slots, during which the processor can conduct transcoding tasks. In step 114, the processor reports (e.g., to controller 43) its availability to perform transcoding tasks during various time slots. Then, in step 116, the transcoding task is performed during a desired time slot by the processor (as selected, e.g., by the controller 43).

The above exemplary embodiments of the various methods and arrangements of the present invention provide for the incorporation of packet-switched technologies in a transport network arrangement of the communications network. The result is that the delays associated with the transport network and the transcoding processes are significantly controlled and often reduced to provide for a reasonably acceptable quality of service while significantly increasing the sharing of limited network resources.

In accordance with certain embodiments of the present invention, a transcoder can be chosen which has processing capacity available at the required moment in time. In this manner, the allocation of the processor capacity is advantageously efficient. Furthermore, by choosing such a processing device, the service queuing and mutual disturbing of voice channels can either be eliminated or significantly reduced.

The exemplary methods and arrangements presented herein are immediately useful for full-rate GSM calls, for example, connecting GSM-to-PSTN, and/or GSM-to-other mobile systems, wherein a transcoding function is needed. These methods and arrangements are also clearly adaptable for use with a variety of configurations, resources, and other codecs, for example, that may be included within a GSM communications system and other like data communications systems wherein packet-switched transport is to be employed.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. An apparatus for use in a communications network having a radio interface, comprising:

a transport network for carrying packets containing coded data representing voice information;

a first node connected to the transport network for receiving said coded data therefrom, said first node operable to send and receive radio signals including said coded data over a radio interface and to output to said transport network information indicative of a radio signal timing parameter associated with the radio signals, wherein the radio signals include the coded data, said radio signal timing parameter information capable of being carried in packets over the transport network; and a second node connected to the transport network, including a plurality of transcoders, each of which is selectively configurable to convert between a first data format and a second data format, the second data format corresponding to the coded data, and a controller configured to receive the radio signal timing parameter information as carried over the transport network, determine in response to said information at least one desired coded data timing parameter, and select from among the plurality of transcoders a selected transcoder to convert between the first data format and the second data format in support of a call, said controller operable to select the selected transcoder based on the availability of the selected transcoder to provide the coded data substantially in accordance with the desired coded data timing parameter.

2. The apparatus as recited in claim 1, wherein each of the plurality of transcoders is further configured to output current status information to the controller, the current status information identifying the availability of the transcoder to support the call.

3. The apparatus as recited in claim 1, wherein the first node and the second node are cooperable to conduct an initial time alignment process for the call, wherein the initial time alignment process produces the desired coded data timing parameter.

4. The apparatus as recited in claim 1, wherein each of the plurality of transcoders is further configured to process a plurality of concurrent calls by assigning each of the concurrent calls to at least one predefined processing period selected from a group of predefined processing periods.

5. The apparatus as recited in claim 4, wherein the controller selects the selected transcoder based on the availability of a predefined processing period that would permit the coded data to reach the first node for transmission over the radio interface substantially in accordance with the radio signal timing parameter.

6. The apparatus as recited in claim 1, wherein the first node includes a base transceiver station.

7. The apparatus as recited in claim 1, wherein the second node includes one of a base station controller and a mobile switching center.

8. The apparatus as recited in claim 1, wherein the first node and the second node are part of a Global System for Mobile (GSM) communications network.

9. The apparatus as recited in claim 8, wherein the first node and the second node are configured to support full-rate GSM calls.

10. The apparatus as recited in claim 8, further comprising a GSM-compatible mobile station coupled to the first node through the radio interface, wherein the call is between the mobile station and at least one non-GSM telecommunications terminal and wherein the coded data includes voice data associated with the call.

11. An apparatus for use in a communications network having a transport network that is configured to carry packets containing coded data representing voice information, at least one radio interface between a mobile station and a base station that is connected to the transport network for receiving the coded data and transmitting it over the radio interface, the base station being configured to determine and output to the transport network a radio signal timing parameter associated with the radio interface, the apparatus being connectable to the transport network and comprising:

a plurality of transcoders, each of which is selectively configurable to convert between a first data format and a second data format, the second data format corresponding to the coded data;

a controller operable to receive from the transport network information indicative of the radio signal timing parameter, determine in response to said information a desired coded data timing parameter, and select from among the plurality of transcoders a selected transcoder to convert between the first data format and the second data format in support of a call, said controller operable to select the selected transcoder based on the availability of the selected transcoder to provide the coded data substantially in accordance with the desired coded data timing parameter; and wherein each of the plurality of transcoders is further configured to output current status information to the controller, the current status information identifying the availability of the transcoder to support the call.

12. The apparatus as recited in claim 11, wherein each of the plurality of transcoders is further configured to process a plurality of concurrent calls by assigning each of the concurrent calls to at least one predefined processing period selected from a group of predefined processing periods.

13. The apparatus as recited in claim 12, wherein the controller is operable to select the selected transcoder based on the availability of a predefined processing period that would permit the coded data to reach the base station for transmission over the radio interface substantially in accordance with the radio signal timing parameter.

14. The apparatus as recited in claim 11, wherein the plurality of transcoders are configurable for use in a Global system for Mobile (GSM) communications network.

15. The apparatus as recited in claim 14, wherein each transcoder is configurable to support a full-rate GSM call.

16. The apparatus as recited in claim 15, wherein the full-rate GSM call is between the mobile station and at least one non-GSM telecommunications terminal and the coded data includes voice data associated with the full-rate GSM call.

17. A method for use in a communications network having a radio interface, the method comprising:

using a transport network to carry between a first node and a second node packets containing coded data representing voice information;

using the first node to send and receive radio signals including the coded data over a radio interface;

determining a radio signal timing parameter associated with the radio signals;

receiving information indicative of the radio signal timing parameter, determining a desired coded data timing parameter in response to said information, and selecting from among a plurality of transcoders a selected transcoder to convert between a first data format and a second data format corresponding to the coded data, said selecting step including selecting the selected transcoder based on the availability of the selected transcoder to provide the coded data substantially in accordance with the desired coded data timing parameter.

18. The method as recited in claim 17, further comprising each of the plurality of transcoders providing current status information identifying the availability of the transcoder to support the call.

19. The method as recited in claim 17, further comprising using each of the plurality of transcoders to process a plurality of concurrent calls by assigning each of the concurrent calls to at least one predefined processing period selected from a group of predefined processing periods.

20. The method as recited in claim 19, wherein the step of selecting further includes selecting the selected transcoder based on the availability of a predefined processing period that would permit the coded data to reach the first node for transmission over the radio interface substantially in accordance with the radio signal timing parameter.

21. The method as recited in claim 17, wherein the call is between a GSM-compatible mobile station coupled to the first node through the radio interface and at least one non-GSM telecommunications terminal, and wherein the coded data includes voice data associated with the call.

* * * * *

UNITED STATES PATENT AND TRADEMARK OFFICE
CERTIFICATE OF CORRECTION

PATENT NO. : 6,512,918 B1 Page 1 of 1
DATED : January 28, 2003
INVENTOR(S) : Szabolcs Malomsoky et al.

It is certified that error appears in the above-identified patent and that said Letters Patent is hereby corrected as shown below:

<u>Column 8,</u>
Line 2, replace "represents.the" with -- represents the --
Line 21, replace "used: a" with -- used: $\alpha$ --
Line 66, replace "transcoder(s)" with -- transcoder(s), --

Signed and Sealed this

Twenty-third Day of September, 2003

JAMES E. ROGAN
*Director of the United States Patent and Trademark Office*